I. L. KEITH.
CEMENTING MACHINE.
APPLICATION FILED APR. 11, 1917.
1,311,605.
Patented July 29, 1919.
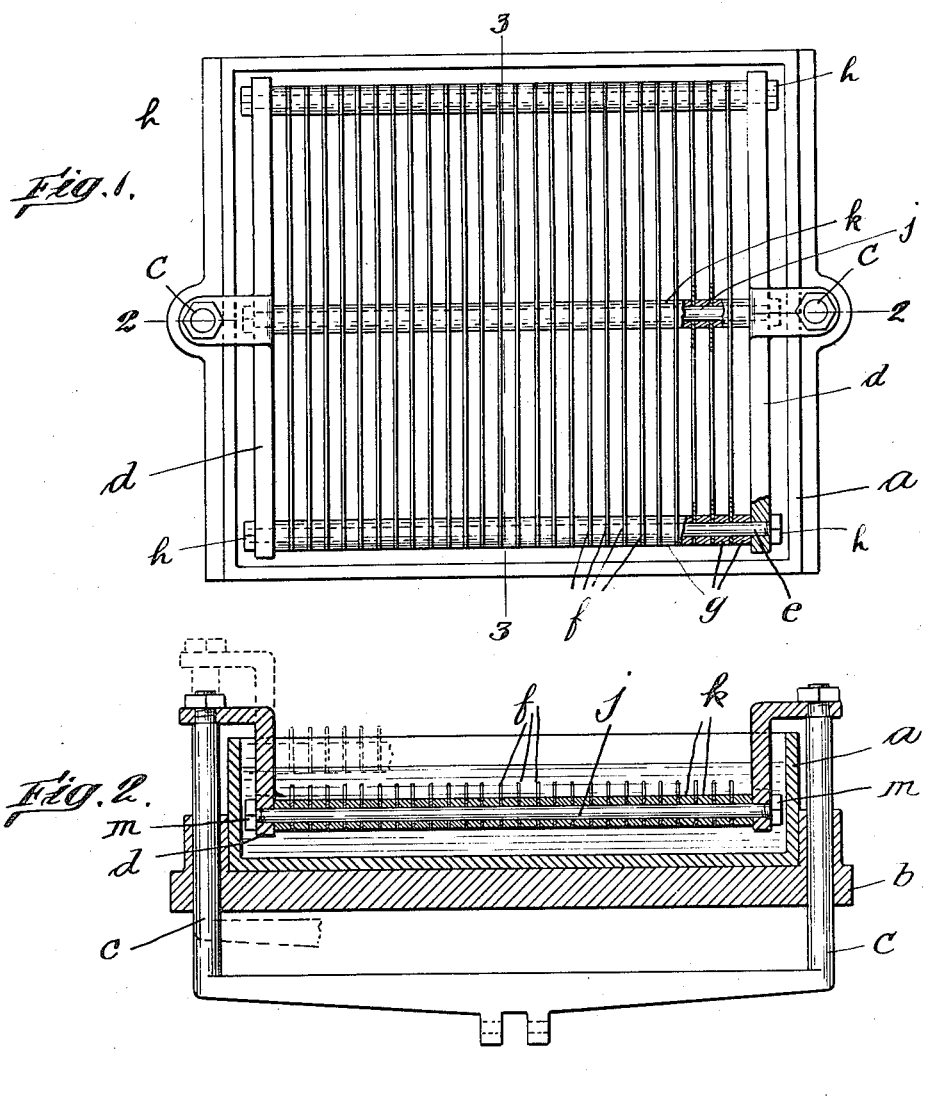

UNITED STATES PATENT OFFICE.

IRVING L. KEITH, OF HAVERHILL, MASSACHUSETTS.

CEMENTING-MACHINE.

1,311,605. Specification of Letters Patent. Patented July 29, 1919.

Application filed April 11, 1917. Serial No. 161,141.

*To all whom it may concern:*

Be it known that I, IRVING L. KEITH, a citizen of the United States, and a resident of Haverhill, county of Essex, and State of Massachusetts, have invented an Improvement in Cementing-Machines, of which the following is a specification.

This invention relates to that class of cementing machines in which a horizontally disposed grid is arranged to be raised and lowered in a receptacle containing liquid cement, so that the grid will be alternately submerged therein and raised above its surface, to permit the material, to which cement is to be applied, to be laid on the upper surface of the grid, on which a relatively small portion of the cement will be retained, so that cement will be applied to the work in lines or dots according to the formation of the grid.

Prior to my invention, a form of grid has been employed which was composed of a series of flat bars arranged edgewise in parallelism and in spaced relation, to permit free flow of cement therebetween, the upper portion of said bars being formed to provide upwardly extending fingers, which applied the cement in dots. It was desirable to form said bars of as thin material as practicable, but when this was done it was found that the pressure on their upper edges caused them to bend and twist, so that the passages therebetween became unduly contracted at some points and unduly enlarged at others, with the result that too much cement was applied at some points and too little at others.

My invention has for its object to provide an improved form of grid of the above described character with means whereby the bars will be held against bending and twisting, so that bars formed of thin and easily bent material may be employed therein.

I accomplish this object by employment of the means shown in the accompanying drawing, in which:—

Figure 1 is a plan view, partly in section of a cementing machine embodying my invention.

Fig. 2 is a vertical longitudinal section on lines 2—2 of Fig. 1.

Fig. 3 is a transverse section on line 3—3 of Fig. 1.

As shown in the drawing, a receptacle $a$, containing liquid cement, is supported on a table $b$, and a cementing grid is arranged in said receptacle and is adapted to be raised and lowered therein by suitable well known mechanism $c$, as indicated.

Said grid comprises a pair of end sections $d$ of rigid material, to which the raising and lowering mechanism of the grid is attached, and a pair of side rods $e$, which extend through the end portions of said end sections, respectively.

A series of cementing bars $f$ are provided which are arranged in parallelism between said end sections and through the end portions of which said side rods $e$ are passed, said bars $f$ being spaced apart by washers $g$ disposed on said rods, one between each bar. Nuts $h$ are provided on the ends of said rods $e$, which project beyond the outer sides of the sections $d$, by means of which said sections, bars $f$ and washers $g$ are all firmly clamped together on said rods.

It is immaterial, for the purposes of my invention, whether the cementing bars $f$ are plane flat bars, so that their upper edges will apply cement in a continuous narrow line, or whether they are provided with teeth, the ends of which apply the cement in dots.

I further, provide, a centrally disposed supporting rod $j$ which extends through the cementing bars $f$ and the end sections $d$, in parallelism with the side rods $e$, and midway therebetween and I also provide a series of spacing washers $k$ on said rod $j$, between said cementing bars, of the same thickness as the washers $g$, and a pair of nuts $m$ on the projecting ends of said rod $j$, which are screwed against the end sections and clamp all of said parts firmly together.

A support is thus provided for the intermediate portions of said bars which hold them securely against any force which would tend to twist them or bend them laterally, so as to vary the width of the spaces between the bars.

A rigid and durable construction is also produced which may be manufactured without difficulty and may be readily assembled.

I claim:—

1. In a machine for applying an adhesive, a support therefor; a reservoir for the adhesive; an instrumentality adapted to bear an adhesive comprising a frame, a plurality of members arranged in spaced relation, said members having their respective ends secured to the frame, means extending transversely of the frame and secured thereto, means on said transverse means to engage said members to reinforce and to retain them in said spaced relation; and means for reciprocating said instrumentality into and out of submersed position in the adhesive.

2. In a machine for applying liquid adhesive, a reservoir for the adhesive, an instrumentality adapted to bear the adhesive comprising a frame, a plurality of parallel members arranged in spaced relation to permit the adhesive to pass freely therebetween and having their respective ends secured to said frame, means interposed between each of said members and extending transversely thereof, to retain the same in said spaced relation, and means for alternately causing submersion and emersion of said members in the adhesive.

3. In a machine for applying liquid adhesive, a reservoir for the adhesive, an instrumentality adapted to bear an adhesive comprising a frame, a plurality of relatively thin, flat metal bars disposed in parallelism and in spaced relation, with one edge uppermost permitting the free passage of adhesive therebetween and having their ends secured to said frame, means interposed between each of said bars and extending transversely thereof to engage and retain said bars in said spaced relation and means for alternately causing submersion and emersion of said bars in the adhesive.

In testimony whereof, I have signed my name to this specification.

IRVING L. KEITH.

Witness:
L. H. HARRIMAN.